United States Patent [19]

Hijikata et al.

[11] 4,360,608
[45] Nov. 23, 1982

[54] EPOXY RESIN-BITUMEN MATERIAL COMPOSITION

[75] Inventors: Kenji Hijikata, Yokkaichi; Kouichi Sakaguchi, Tsu, both of Japan

[73] Assignee: Mitsubishi Petrochemical Co., Ltd., Tokyo, Japan

[21] Appl. No.: 268,057

[22] Filed: May 28, 1981

[30] Foreign Application Priority Data

May 31, 1980 [JP] Japan .................................. 55-73471

[51] Int. Cl.³ .............................................. B22C 11/22
[52] U.S. Cl. .................................... 523/450; 523/456; 523/463; 523/400
[58] Field of Search ............ 260/28 R, 28 P, 33.6 EP; 523/147, 450, 474, 491; 524/59, 68, 541, 594

[56] References Cited

U.S. PATENT DOCUMENTS 2,819,241 1/1958 De Groote ........................ 260/28 P
2,819,242 1/1958 De Groote ........................ 260/28 P

*Primary Examiner*—Melvyn I. Marquis
*Attorney, Agent, or Firm*—Oblon, Fisher, Spivak, McClelland & Maier

[57] ABSTRACT

An epoxy resin-bitumen material composition is prepared by mixing an epoxy resin and a bitumen material in the presence of a co-solubilizer represented by the general formula

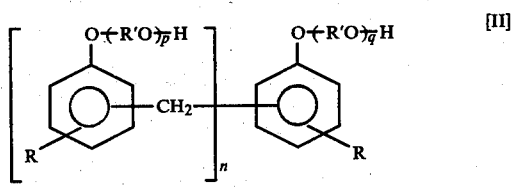

wherein R is hydrogen or a hydrocarbyl group having 1–9 carbon atoms, R' is an alkylene group having 2–3 carbon atoms, n is an integer 1–10 inclusive, and p and q are respectively an integer of 0–40 in average. The resulting composition is useful as a road pavement material, bonding material for railroad track ballast, anti-corrosion agent, etc. The cured product resulting from this composition is advantageous in that it has good heat resistance and free from bleeding.

17 Claims, 1 Drawing Figure

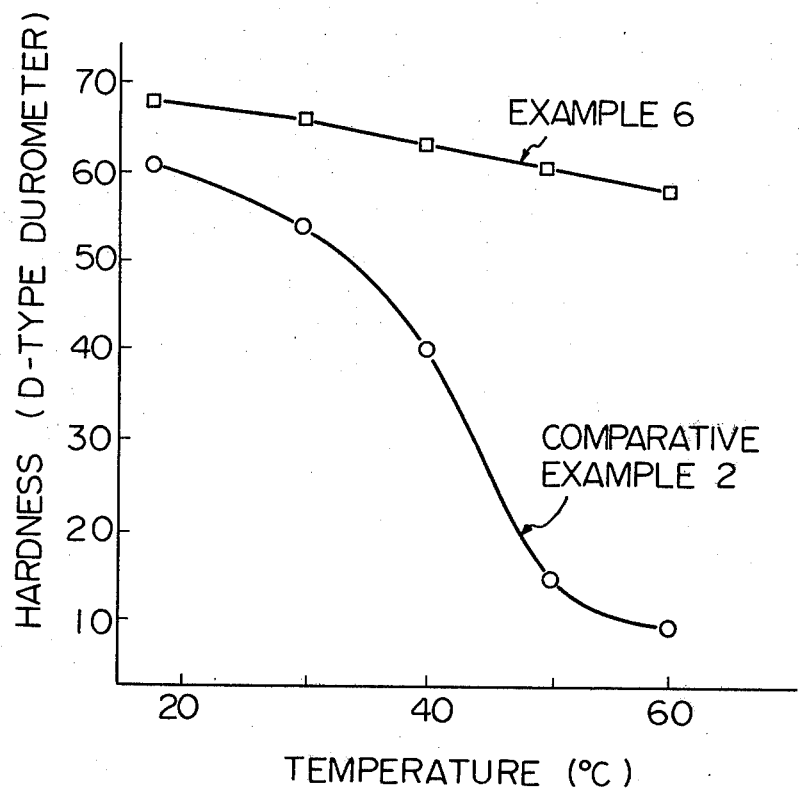

EPOXY RESIN-BITUMEN MATERIAL COMPOSITION

BACKGROUND OF THE INVENTION

This invention relates to a novel composition comprising an epoxy resin and a bitumen material.

Of the bitumen materials, tar is well miscible with an epoxy resin, especially glycidylether of bis-phenol, and mixtures thereof have long been used as anti-corrosion paints and paving materials. The mixtures are cured with a hardener and form films having excellent characteristics including excellent adhesion to steel and ballast. However, they have some defects. For one thing, benzopyrenes contained in the tar is a source of environmental pollution, and for another, the formed coating films become brittle with the passage of time.

As bitumen materials which can be substituted for the tar, there are asphalt materials and lubricating oil materials of similar compositions. But they do not have good compatibility with epoxy resins, especially bis-phenol glycidylether type resin. So it is generally difficult to prepare a homogeneous mixture of an asphalt or a lubricating oil and said resin.

Therefore, various techniques have been attempted including methods in which specific hardeners are used; methods in which tar and asphalt are used in combination, and methods in which a large amount of a co-solubilizer is used, as disclosed in Japanese patent application Publications No. 8468/63, 8035/69, 21115/71, 1840/73, etc. But all of these methods still have the following defects: (1) Selection of hardeners from a wide range, which is possible with the epoxy resins, is not permitted; (2) Plasticity of the composition is disadvantageously increased by the use of a large amount of co-solubilizers; (3) Properties of the resulting cured products such as hardness, thermal deformation resistance, etc. are deteriorated; etc. Also these methods lack versatility and adaptability to all kinds of asphalts of different compositions from different countries. For instance, if an asphalt from Iranian crude oil, which is rich in aromatic ingredients, is replaced with the asphalt from an Arabian, Venezuelan or USSR crude oil, which is lower in aromatic contents, sufficient compatibility between the epoxy resin and the asphalt can no longer be achieved with the conventional co-solubilizer, nonylphenol for instance, and thus the epoxy esin and the asphalt in the mixture are readily separated.

Our aim was to eliminate these defects of the known epoxy resin-bitumen material compositions, and we have found a new co-solubilizer suitable for this purpose.

DISCLOSURE OF THE INVENTION

This invention provides a composition comprising an epoxy resin, a bitumen material selected from a class consisting of asphalts and lubricating oils, and a mixture of polyether-polyols represented by the general formula:

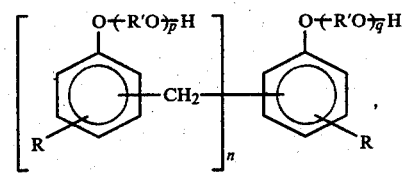

[II]

wherein R is hydrogen or a hydrocarbyl group having 1-9 carbon atoms, R' represents $-CH_2CH_2-$ or $-CH_2CH_2CH_2-$, n is an integer of 1 to 10 inclusive, and each of p and q is an integer within the range of 0-40 inclusive and the average value of each in the mixture is 3-30, preferably about 5-about 20.

This mixture of the polyether-polyol is obtained by reacting at least three (3) moles of ethylene oxide or propylene oxide with one mole of a novolak resin represented by the general formula:

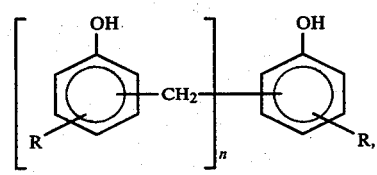

[I]

wherein R and n are as defined above, in the presence of an alkali hydroxide such as NaOH, KOH, etc., ferric chloride (III) or tin chloride (IV).

The preferred co-solubilizers used in this invention as represented by the general formula [II] are as follows:

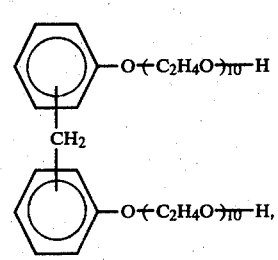

[A]

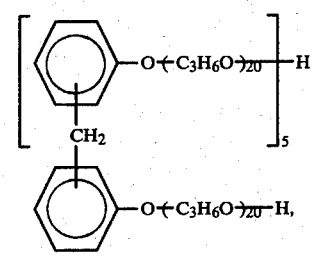

[B]

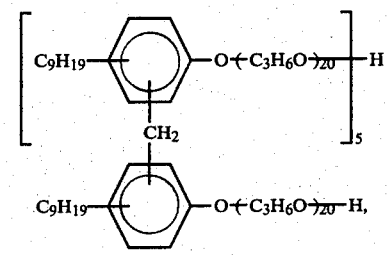

[C]

-continued

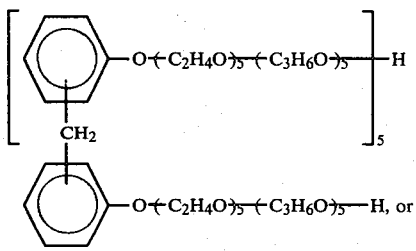

[D]

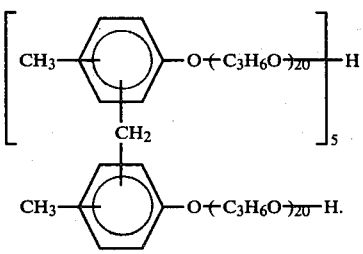

[E]

In the foregoing formulas, the numbers corresponding to p and q in the formula [II] are average values.

The epoxy resin used in this invention is a compound containing at least one, preferably two or more, epoxy groups, for instance, polyglycidylether of polyhydric phenol such as 2,2-bis-(4-hydroxyphenyl)-propane; bis-(4-hydroxyphenyl)-methane; 1,1-bis-(4-hydroxyphenyl)ethane, etc.; polyglycidylether of polyhydric alcohol such as glycerine, pentaerythritol, trimethylolpropane, etc.; diglycidylether of polyalkylene polyethers; diglycidylether of polycarboxylic acid, or so-called dimeric acid or mixture of these. Of these, polyglycidylether of polyhydric phenol, which is versatile, is preferred.

The asphalt materials used in this invention include: lake asphalt such as Trinidad Epure, gilsonite, pyrobitumen, etc.; natural asphalt such as rock asphalt; cutback asphalt therefrom; petroleum asphalt and petroleum pitch such as straight asphalt and blown asphalt produced in the process of refining petroleum; cutback asphalt therefrom; mixed bitumen such as pitch bitumen, astar etc.; flux oil, cycle oil from catalytic decomposition of heavy crude oil, cycle oil from catalytic decomposition of light crude oil, etc. The lubricating oil materials used in this invention include lube cut and petroleum process oil obtained by extraction, refining and hydrogenation, etc., of the lube cut or other distillation fractions of petroleum as well as any mixture of the above. Especially preferred are process oils which are liquid at ordinary temperatures, have a pour point of not higher than 5° C., a $C_A$ value of not less than 36% and less than 70%, a $C_N$ value of not less than 29%, whereby the sum of the $C_A$ value and the $C_N$ value is more than 70% when they are measured by the n-d-M ring analysis, since they give good cured products which are less susceptible to bleeding. Some examples of such process oils which satisfy the above-mentioned conditions are the process oils obtained as by-products from Venezuelan crude oils such as "Lama", "Santa Maria", etc.

In combination with the above-described polyether-polyol represented by the general formula [II], there can be used an alkylphenol such as nonylphenol, which has been conventionally used as the co-solubilizer for epoxy resins and bitumen materials, or a co-solubilizer produced by Mitsubishi Petrochemical Co., Ltd. on an experimental basis, which is represented by the general formula;

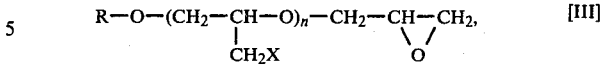

wherein R is a straight chain or branched alkyl group having 8–15 carbon atoms, X is a halogen atom and n is an integer of 0–3. These auxiliary co-solubilizers can occupy up to 50% by weight of the total amount of the co-solubilizer.

The glycidylether compound represented by the general formula [III] can be prepared by reacting a straight chain or branched aliphatic alcohol having 8–15 carbon atoms with at least an equimolar amount of epihalohydrin in the presence of an acid catalyst so as to give an epihalohydrin adduct of said aliphatic alcohol; dissolving the resulting adduct in a solvent such as toluene, methylethylketone, etc. and subjecting it to the dehydrohalogenation reaction by adding an aqueous solution of an alkali; thereafter separating the solvent layer, followed by washing with water and distillation. The thus obtained glycidylether compound is usually a mixture of compounds respectively represented by the general formula [III] and this mixture can be used as is.

The epoxy resin-bitumen material composition obtained in accordance with this invention can, with addition of a hardener, be used as a curable composition in various applications. In such cases, as the hardener, the hardeners generally used for epoxy resins such as amino compounds having at least one hydrogen atom attached to the nitrogen atom, for instance, diethylenetriamine, triethylenetetramine, xylylenediamine, m-phenylenediamine, diaminodiphenylmethane, diaminodiphenylsulfone, anilineformaldehyde resins; adducts of one of these compounds and an epoxy-group-containing compound, acrylonitrile, an acrylic acid ester or the like; polyamide amines derived from an aliphatic polyamine and a dimer of an unsaturated aliphatic fatty acid; polycarboxylic acids or anhydrides thereof, such as phthalic anhydride, hexahydrophthalic anhydride, methyl-endo-methylene-tetrahydrophthalic anhydride, maleic anhydride, dodecenylsuccinic anhydride; polythiols such as bis-(2-hydrothioethyloxy)-methane; secondary or tertiary amines such as benzylmethylamine, tris-(dimethylaminomethyl)-phenol, imidazole, pyridine, triethanolamine, etc., as well as dicyandiamide, $BF_3$, amine salts, etc.

When the epoxy resin-bitumen material composition prepared in accordance with this invention is to be used as a curable composition, per 100 parts by weight of an epoxy resin, about 300–about 300 parts by weight, preferably about 50–about 300 parts by weight, more preferably about 100–about 300 parts by weight of a bitumen material, that is, an asphalt or a lubricating oil or a mixture thereof is combined. When less than about 30 parts by weight of the bitumen material is used, per 100 parts by weight of epoxy resin, the bitumen material does not significantly fulfil its role as the extender. If more than about 300 parts by weight of the bitumen material is used, the resulting composition loses its stability, and the properties of the cured products are degraded as well.

The co-solubilizer represented by the general formula [II] is incorporated in the composition in an amount of about 0.3–about 30 parts by weight, preferably about 1–about 20 parts by weight, more preferably about 3–about 10 parts by weight per 100 parts of the epoxy resin used. When the amount of the bitumen material is large, the amount of the added co-solubilizer must be increased and about 10% of the weight of the bitumen material is used. If more than 30 parts by weight of the co-solubilizer is used per 100 parts by weight of the epoxy resin, it does not give better dispersion effect but develops plasticizing effect. Therefore, the amount of the co-solubilizer is not more than about 30 parts by weight. When alkylphenol is used in combination, the amount thereof is about 3–about 10 parts by weight per 100 parts by weight of the epoxy resin used. At least about 3 parts by weight is required to attain a significant effect. If more than about 10 parts by weight thereof is used, the plasticizing effect becomes undesirably large.

The hardener for the epoxy resin is used in an amount of about 4–about 200 parts by weight, desirably about 10–about 100 parts by weight per 100 parts by weight of the epoxy resin.

In combination with the above-mentioned hardeners, curing accelerators can be used. Such accelerators include: quaternary ammonium salts such as tetraethylammonium chloride, tetraethylammonium bromide, cetyltrimethylammonium chloride, etc.; tertiary amines such as benzyldimethylamine, triethylamine, 2,4,6-(tris-dimethylaminoethyl)-phenol, etc.; amine hardening catalysts such as 2-methyl-4-methylimidazole, 2-phenylimidazole, 1-benzyl-2-methylimidazole, 2-ethyl-4-methylimidazoleazine, imidazoleazines containing 11 carbon atoms (not including hexamethylene tetramine); lithium salts such as lithium chloride, lithium bromide, lithium iodide, etc., and the like. These accelerators are usually used in an amount of 1–10% by weight of the epoxy resin used.

When the composition prepared in accordance with this invention is used as a curable composition, if desired, aromatic resins such as phenol resins, coumarine-indene resins, petroleum resins, styrene resins, xylene resins, etc., and aliphatic resins such as terpene resins, polypropylene, polybutene, ethylene-vinyl acetate copolymer, etc. can be incorporated. Also other additives conventionally used in synthetic resin coating materials such as plasticizers, antioxidants, burning retardants, dispersing agents, organic solvents, aggregates, etc. can be incorporated.

BRIEF DESCRIPTION OF THE ATTACHED DRAWING

Now the invention is described in detail with reference to the attached drawing, which is a diagram giving a comparison of the temperature-sensitivity of the cured product of Example 6 and that of Comparative Example 2.

DESCRIPTION OF THE PREFERRED EMBODIMENTS

In the working examples described hereinafter, the methods of measurements employed were as follows:

(1) Separation of mixed compositions (%)

A well-stirred homogeneous mixture of epoxy resin, bitumen material, and co-solubilizer was placed in a graduated measuring cylinder. After the mixture had been allowed to stand for 1 week at 20° C., the degree of separation was measured by reading the scale of the cylinder.

(2) Bleeding in cured products (%)

Three days after a composition was cured, the cured product was immersed in water of 80° C. for three hours. The cured product was dried and the difference between before and after immersion was determined.

(3) Hardness of cured products

Seven days after a composition was cured at room temperature, hardness of the cured product was measured using a D-type durometer specified in ASTM D-2240-75.

(4) Bending strength

Seven days after a composition was cured at room temperature, bending strength value (at 25° C.) was measured in accordance with the general method for testing thermosetting plastic materials specified in JIS-K6911.

Preparation of Co-solubilizer A

In a stainless steel autoclave equipped with an agitator, 100 parts by weight of bis-phenol F was placed, and 200 parts by weight of cyclohexane, and 1 part by weight of caustic soda were added. After the air in the autoclave was replaced with nitrogen, 440 parts by weight of ethylene oxide was introduced. Then the temperature and pressure of the system were raised, and the reaction was allowed to continue at 140° C. under a pressure of 40 kg/cm$^2$ for 2.5 hours. After the lowering in the pressure was observed, the system was still kept at that temperature until the pressure dropped to 0.1 kg/cm$^2$ g.

After completion of the reaction, the system was allowed to stand until it cooled to room temperature. The reaction mixture was taken out, neutralized with diluted hydrochloric acid, washed with water and distilled so as to expel the solvent, and thus 507 parts by weight of yellow-brown product was obtained.

The hydroxyl value of this product was 104.2 mg/g. This means that the molecular weight of this product is 1076, and the product has 10 moles of ethylene oxide added per one phenol of bis-phenol F in average.

Preparation of Co-solubilizers B–E

In the same way as described above, co-solubilizers B–E were prepared under the conditions as shown in Table 1, which includes the preparation conditions for the co-solubilizer A, too.

TABLE 1

| Co-Solubilizer *1 | | A | B | C | D | E |
|---|---|---|---|---|---|---|
| | | | *2 | *3 | *2 | *4 |
| | | Bis-phenol | Hexanuclear | Hexanuclear | Hexanuclear | Hexanuclear |
| Composition | Polynuclear | F | phenol | bobylphenol | phenol | cresol |
| (parts | phenol | 100 | 50 | 100 | 100 | 50 |
| by wt.) | Ethylene oxide | 440 | — | — | 256 | — |
| | Propylene oxide | — | 674 | 544 | 338 | 580 |
| | Solvent | 200 | 100 | 200 | 200 | 100 |
| | Catalyst (NaOH) | 1.0 | 0.5 | 1.0 | 1.0 | 0.5 |

TABLE 1-continued

| Co-Solubilizer *1 | A | B | C | D | E |
|---|---|---|---|---|---|
| Reaction temp. (°C.) | 140 | 140 | 140 | 140 | 140 |
| Reaction pres. (kg/cm$^2$) | 4.0 | 4.0 | 4.0 | 4.0 | 4.0 |
| Reaction time (hr.) | 2.5 | 2.5 | 2.5 | 2.5 | 2.5 |
| Hydroxyl value (H.V.) $\left(\dfrac{KOH}{mg/g}\right)$ | 104.2 | 45.9 | 37.7 | 91.7 | 44.8 |
| MW calculated from H.V. | 1076 | 7463 | 8928 | 3671 | 7513 |

*1 Compounds represented by the general formula [A], [B], [C], [D], and [E] indicated above.
*2 A compound of the general formula [I] wherein n is 5 and R is hydrogen.
*3 A compound of the general formula [I] wherein n is 5 and R is nonyl.
*4 A compound of the general formula [I] wherein n is 5 and R is methyl.

Polynuclear phenols indicated in Table 1 are commercially available, for instance from Showa Denko Kabushiki Kaisha, as the products of commercial grade.

Preparation of Co-Solubilizer F

To 194 g of a synthesized $C_{12}$–$C_{13}$ alcohol, of which the percentage of the straight chain is 80%, the carbon atom ratio $C_{12}/C_{13}$ of the alkyl chain is 44/56, ("Dovanol 23" produced by Mitsubishi Petrochemical Co., Ltd.), was added 22 g of BF$_3$-etherate. To this mixture, 92.5 g of epichlorohydrin was added by dropping at 45° C. and the reaction was allowed to continue for 4 hours until completion. From the reaction mixture, was obtained 195 g of glycidylether of the above "Dovanol 23" as the distillation fraction of 140°-160° C./2 mm Hg. This glycidylether compound, which belongs to the compounds represented by the general formula [III], exhibited a viscosity of 6 cp at 25° C. and the epoxy equivalent value thereof was 257. This means that the average value of n in the general formula [III] is 0.07 for this product.

EXAMPLE 1

One hundred (100) parts by weight of straight asphalt from "Arabian Light" crude oil, the penetration value of which was 180–200 at 25° C., was melted at 80° C., and 100 parts by weight of a polyglycidylether of 2,2'-bis-(4-hydroxyphenyl)-propane ("Epikote #828") available from Yuka Shell Kabushiki Kaisha and 100 parts by weight of the above described co-solubilizer A were added thereto. The mixture was well stirred. A portion of the thus obtained homogeneous mixture was placed in a graduated measuring cylinder, and was allowed to stand at 20° C. for one week. The mixture did not separate and thus it was revealed that the mixture was quite homogeneous and stable. To the composition after standing, 12 parts by weight of tetraethylenepentamine (TEPA) was added and the resulting mixture was well agitated. Then a cured product was obtained after 60 minutes. After three days, the bleeding and hardness of the cured product were measured. The results are shown in Table 2.

COMPARATIVE EXAMPLE 1

In the same way as in Example 1 except that 10 parts by weight of nonylphenol was used instead of co-solubilizer A, an epoxy resin-bitumen material composition was prepared. A portion of the homogeneously mixed composition was placed in a graduated measuring cylinder at 20° C. Separation occurred immediately and the degree of separation after 30 minutes was 32%.

COMPARATIVE EXAMPLE 2

In the same way as in Comparative Example 1 except that the amount of the nonylphenol used was increased to 40 parts by weight, an epoxy resin-bitumen material composition was prepared. This composition did not separate even after one week. When the composition was cured in the same way as described in Example 1, a homogeneous cured product was obtained. However, this product was poor in bending strength.

EXAMPLES 2–25 AND COMPARATIVE EXAMPLES 3–8

Various compositions were prepared by mixing the epoxy resin used in Example 1 with varied bitumen materials and co-solubilizers and the compositions were cured. The bitumen materials and hardeners used are indicated in Table 2 together with the physical properties of the cured products. In Example 11 and 12, an alkyl-substituted phenol was used in combination with the indicated co-solubilizer in accordance with this invention.

TABLE 2

| Example | Comparative Ex. | Bitumen Material Species | Bitumen Material Parts by wt. | Co-solubilizer Species | Co-solubilizer Parts by wt. | Hardener Species | Hardener Parts by wt. | Separation of Mixture (%) | Bleeding (%) | Hardness (20° C.) | Hardness (60° C.) | Bending Strength (kg/cm$^2$) |
|---|---|---|---|---|---|---|---|---|---|---|---|---|
| 1 | | SA-A | 100 | A | 10 | TEPA | 12 | Does not occur | 0.5 | 71 | 61 | 390 |
| 2 | | " | " | B | 10 | " | " | Does not occur | 0.4 | 69 | | |
| 3 | | " | " | C | 10 | " | " | Does not occur | 0.4 | 64 | | |
| 4 | | " | " | D | 10 | " | " | Does not occur | 0.3 | 68 | | |
| 5 | | " | " | E | 10 | " | " | Does not occur | 0.4 | 64 | | |
| 6 | | " | " | B | 3 | " | " | Does not occur | 0.4 | 68 | | |
| 7 | | " | " | " | 1 | " | " | Does not occur | 0.5 | 70 | | |

TABLE 2-continued

| Example | Comparative Ex. | Bitumen Material Species | Bitumen Material Parts by wt. | Co-solubilizer Species | Co-solubilizer Parts by wt. | Hardener Species | Hardener Parts by wt. | Separation of Mixture (%) | Bleeding (%) | Hardness (20° C.) | Hardness (60° C.) | Bending Strength (kg/cm²) |
|---|---|---|---|---|---|---|---|---|---|---|---|---|
| 8 | | " | " | " | 10 | Xylylene diamine | 18 | Does not occur | 0.5 | 69 | | |
| 9 | | " | " | " | 10 | Epomate B-002 [*1] | 50 | Does not occur | 0.3 | 64 | | |
| 10 | | " | " | " | 10 | Tohmide T-245 [*2] | 50 | Does not occur | 0.3 | 63 | | |
| 11 | | " | " | B  NP | 10  10 | TEPA [*3] | 12 | Does not occur | 0.1  0.1 | 64  64 | | |
| | 1 | " | " | NP | 10 | " | " | 32 | Does not harden | — | | |
| | 2 | " | " | " | 40 | " | " | Does not occur | 0.4 | 61 | 10 | 170 |
| 12 | | " | " | B  NV | 10  10 | " | " | Does not occur | 0.1 | 66 | | |
| | 3 | " | " | NV | 10 | " | " | 33 | Does not harden | — | | |
| | 4 | " | " | " | 40 | Xylylene diamine | 18 | Does not occur | 16 | — | | |
| 13 | | BA-A | 100 | B | 10 | TEPA | 12 | Does not occur | 0.3 | 72 | | |
| 14 | | BA-B | 100 | " | " | " | " | Does not occur | 0.3 | 72 | | |
| 15 [*4] | | T  F | 80  20 | " | " | " | " | Does not occur | 0.5 | 65 | | |
| 16 | | G  SA-A | 50  50 | " | " | " | " | Does not occur | 0.5 | 69 | | |
| 17 [*4] | | T  SA-A | 50  50 | " | " | " | " | Does not occur | 0.2 | 62 | | |
| 18 | | P(S) | 100 | " | " | " | " | Does not occur | 0.3 | 64 | | |
| 19 | | FX | 100 | " | 10 | " | " | Does not occur | 0.3 | 65 | | |
| 20 | | SA-A | 300 | " | 30 | " | " | Does not occur | 0.9 | 64 | | 280 |
| | 5 | " | 400 | " | 50 | " | " | 7 | Does not harden | — | | |
| | 6 | " | 100 | " | " | " | " | Does not occur | 0.3 | 62 | | 170 |
| 21 | | " | 30 | " | 0.1 | " | " | Does not occur | 0.4 | 73 | | |
| | 7 | " | " | " | 0.05 | " | " | 7 | 12 | — | | |
| | 8 | " | 100 | B  NP | 10  20 | " | " | Does not occur | 0.1 | 62 | | |
| 22 | | " | 100 | A  F | 7  3 | " | 12 | Does not occur | 0.4 | 69 | | 360 |
| 23 | | EX | 100 | B | 5 | " | " | Does not occur | 0.04 | 67 | 61 | 350 |
| 24 | | " | " | B | 5 | Xylylene diamine | 18 | Does not occur | 0.06 | 68 | | |
| 25 | | SA-A | " | A  F | 7  3 | TEPA | 12 | Does not occur | 0.4 | 69 | 60 | 360 |

[*1] Available from Yuka Shell Epoxy Kabushiki Kaisha
[*2] Available from Toto Kasei Kabushiki Kaisha
[*3] Tetraethylpentamine
[*4] Reference Examples In Table 2, the indicated amounts of the bitumen materials, co-solubilizers and hardeners used are parts by weight per 100 parts by weight of the epoxy resin ("Epikote #828"). The abbreviations indicating the bitumen materials and co-solubilizers (excepting the polyether-polyols in accordance with this invention) stand for the following materials.

Bitumen materials

SA-A: Straight asphalt from "Arabian Light" crude oil having a penetration value of 180–200 at 25° C.
BA-A: Blown asphalt from "Arabian Light" crude oil having a penetration value 30–40 at 25° C.
BA-B: Blown asphalt from a Venezuelan crude oil having a penetration value of 30–40 at 25° C.
TE: Trinidad Épuré
F: Flux oil
G: Gilsonite
T: Tar
P(S): Process oil ("Shellflex 371JY"), $C_A$ 5%, $C_N$ 39.5%, $C_P$ 55.5%
FX: Furfural extract from lubricating oil
BEX: Process oil ("Venezuela Extract"), $C_A$ 42%, $C_N$ 30%, $C_P$ 28%

Co-solubilizers

NP: Nonylphenol
NV: Novolak type phenol resin or the general formula [II] wherein n=5 and R=H, dissolved in a bitumen material beforehand As shown in Table 2, the compositions of this invention can be used with a far smaller amount of co-solubilizer in comparison with the conventional compositions of the same kind, and the resulting cured products are very homogeneous. Also as seen in Examples 8–10, the hardener can be selected from a wide range, while with the conventional co-solubilizer, a large amount thereof must be used, and the range of usable hardeners is limited as seen in Comparative Example 5. When, as the co-solubilizer, the polyether-polyol in accordance with this invention and an alkyl-substituted phenol are used in combination, bleeding of the cured product is lessened as seen in Example 11 and 12.

As can be seen from comparison of Example 8 and 24, when process oils which have specific values of $C_A$ and $C_N$ are used, bleeding property of the cured products is further improved.

Comparison of Temperature-Sensitivity of Cured Products

The temperature-sensitivities of the cured products of Example 6 and Comparative Example 2 were compared. That is, the hardnesses of the two cured products were measured between 20° C. and 60° C. inclusive at ten degree intervals. The results are shown in the attached drawing, from which it will be noted that the cured product obtained from the composition of this invention exhibits a very small change due to temperature change.

Industrial Applicability

This invention makes it possible to combine a large amount of bitumen materials, which are quite inexpensive, with the expensive epoxy resin. Therefore, a great reduction in cost is achieved, opening the way to a large scale use of the epoxy resin compositions in the field of civil engineering and construction. A stable dispersion mixture is obtained regardless of compositions and properties of bitumen materials used. The hardener in the curable composition is selectable from a wide range, and it is possible to determine the pot life, hardening time and the physical properties of the cured products as desired. Only a small amount of co-solubilizer is used, and temperature-sensitivity or heat resistance of the cured product is improved. By the combined use of an alkyl-substituted phenol such as nonyl-phenol in the co-solubilizer, bleeding in the surface of the cured products is lessened.

The composition of this invention can e used as a resin mortar by mixing it with fine aggregate. The resulting cured products exhibit good adhesion, abrasion resistance and resistance to slipping. Thus the curable composition in accordance with this invention is preferable for use in pavement and non-slip finishing of roads, parking areas, athletic grounds, factory sites, etc., and bonding of railroad track ballast and is also widely usable as a primer, adhesive, surface protector, water proofing agent, heavy duty anti-corrosion agent, etc. in building and construction work.

We claim:

1. An epoxy resin-bitumen material composition comprising an epoxy resin, a bitumen material selected from a class consisting of asphalts and lubricating oils and a mixture of novolakbased polyether-polyols represented by the general formula:

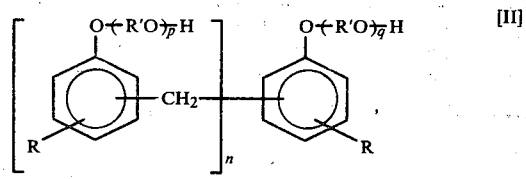

wherein R is hydrogen or a hydrocarbyl group having 1–9 carbon atoms, R' represents $-CH_2-CH_2-$ or $-CH_2-CH_2-CH_2-$, n is an integer of 1–10 inclusive, and each of p and q is an integer within the range of 0–40 and the average value of each in the mixture is 3–30.

2. The epoxy resin-bitumen material composition as claimed in claim 1, which comprises 100 parts by weight of the epoxy resin, about 30–about 300 parts by weight of the bitumen material and about 0.3–about 30 parts by weight of the polyether-polyol.

3. The epoxy resin-bitumen material composition as claimed in claim 1 or claim 2, wherein the bitumen material is one selected from a class consisting of lake asphalt, cutback asphalt from the natural asphalt, petroleum asphalt and petroleum pitch, cutback asphalt from the petroleum asphalt and petroleum pitch, mixed bitumen, cycle oil from catalytic decomposition of heavy crude oil, cycle oil from light crude oil, lubricating oil and mixture of the above.

4. The epoxy resin-bitumen material composition as claimed in claim 3, wherein the bitumen material is one selected from a class consisting of straight asphalt, blown asphalt, flux oil, gilsonite and lubricating oil.

5. The epoxy resin-bitumen material composition as claimed in claim 4, wherein the bitumen material is one selected from a class consisting of straight asphalt from "Arabian Light" crude oil having a penetration value of 180–200 at 25° C., blown asphalt from "Arabian Light" crude oil having a penetration value of 30–40 at 25° C., blown asphalt from Venezuelan crude oil having a penetration value of 30–40 at 25° C., Trinidad Épuré, flux oil, gilsonite, process oil, furfural extract from lubricating oil.

6. The epoxy resin bitumen material composition as claimed in claim 5, wherein the bitumen material is a process oil of which the pour point is 5° C. or lower, the $C_A$ value is more than 36% and less than 70% and the $C_N$ value is more than 29% and the sum of the $C_A$ value and the $C_N$ value is more than 70% when measured by the n-d-M ring analysis.

7. The epoxy resin-bitumen material composition as claimed in claim 1 or claim 2, wherein the epoxy resin is one selected from a class consisting of polyglycidylether of polyhydric phenol, phlyglycidylether of polyhydric alcohol, diglycidylether of polyalkylene polyether, diglycidylether of polycarboxylic acid and dimer of polycarboxylic acid.

8. The epoxy resin-bitumen material composition as claimed in claim 7, wherein the epoxy resin is one selected from a class consisting of 2,2-bis-(4-hydroxyphenyl)propane, bis-(4-hydroxyphenyl)-methane; 1,1-bis-(4-hydroxyphenyl)-ethane; polyglycidylether of glycerine, polyglycidylether of pentaerythritol, polyglycidylether of trimethylolpropane, diglycidylether of polyalkylene-polyether, diglycidylether of polycarboxylic acid, dimer of polycarboxylic acid and mixtures of the above.

9. The epoxy resin-bitumen composition as claimed in claim 8, wherein the epoxy resin is a polyglycidylether of 2,2'-bis-(4-hydroxyphenyl)-propane.

10. The epoxy resin-bitumen material composition as claimed in claim 1 or claim 2, wherein the mixture of polyether-polyol is a mixture of polyether-polyols represented by the general formula [II] as indicated above, wherein R is hydrogen, methyl or nonyl, R' is —CH$_2$—CH$_2$— or —CH$_2$—CH$_2$—CH$_2$—, n is 5 and each of p and q is an integer of about 5–about 20 in average.

11. The epoxy resin-bitumen material composition as claimed in claim 10, wherein the mixture of polyether-polyol is a mixture of polyether-polyols represented by the general formula

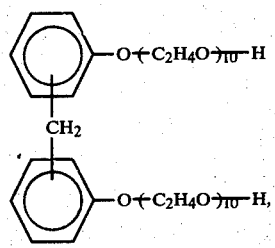

[A]

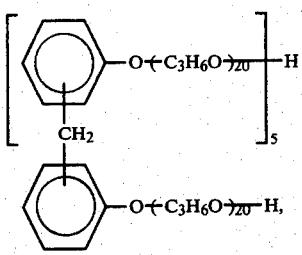

[B]

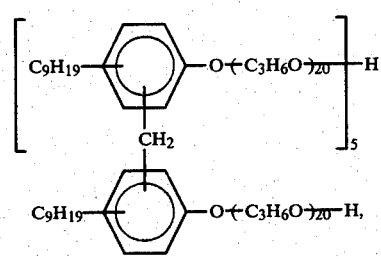

[C]

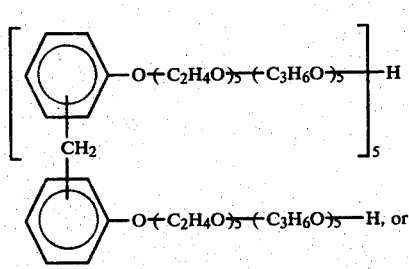

[D]

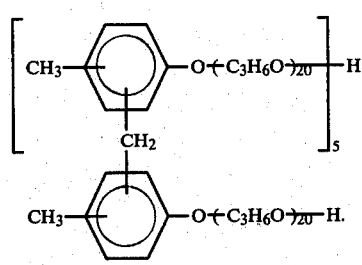

[E]

wherein the numbers corresponding to p and q in the general formula [II] are average values respectively.

12. The epoxy resin-bitumen material composition as claimed in claim 1, which contains an alkylphenol and/or a compound represented by the general formula:

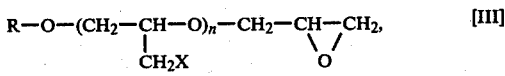

[III]

wherein R is a straight chain or branched alkyl group having 8–15 carbon atoms, X is a halogen atom and n is an integer of 0–3 inclusive.

13. The epoxy resin-bitumen material composition as claimed in claim 12, wherein the alkyl phenol is nonylphenol and the compound represented by the formula [III] is glycidylether of an alkyl alcohol of which percentage of straight chain is 81%, the carbon atom ratio $C_{12}/C_{13}$ of the alkyl chain is 44/56.

14. The epoxy resin-bitumen material composition as claimed in claim 1, which comprises 100 parts by weight of the epoxy resin, about 50–about 300 parts by weight of the bitumen material, and about 1–about 20 parts by weight of the polyether-polyol.

15. The epoxy resin-bitumen material composition as claimed in claim 14, which comprises 100 parts by weight of the epoxy resin, about 100–about 300 parts by weight of the bitumen material and about 3–about 10 parts by weight of the polyether-polyol.

16. The epoxy resin-bitumen material composition as claimed in claim 12, which contains about 3–about 10 parts by weight of the alkylphenol or the compound of the general formula [III].

17. In the method for preparing epoxy resin-bitumen material composition, an improvement comprising admixing a bitumen material selected from a class consisting of asphalt materials and lubricating oil materials and a co-solubilizer which is a polyether-polyol obtained by reacting one mole of a novolak resin represented by the general formula

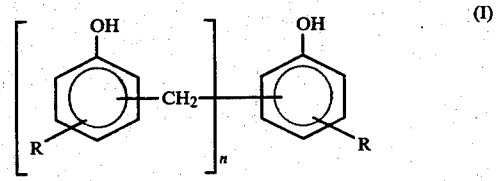

(I)

wherein n is an integer of 1–10 inclusive, R is hydrogen or a hydrocarbyl group having 1–9 carbon atoms, with at least three moles of ethylene oxide or propylene oxide.

* * * * *